(12) United States Patent
Sugiura

(10) Patent No.: US 9,831,496 B2
(45) Date of Patent: Nov. 28, 2017

(54) NONAQUEOUS ELECTROLYTIC SOLUTION SECONDARY BATTERY

(71) Applicant: TOYOTA JIDOSHA KABUSHIKI KAISHA, Toyota-shi, Aichi (JP)

(72) Inventor: Ryuta Sugiura, Toyohashi (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 15/340,024

(22) Filed: Nov. 1, 2016

(65) Prior Publication Data

US 2017/0125795 A1    May 4, 2017

(30) Foreign Application Priority Data

Nov. 4, 2015   (JP) .................. 2015-217137

(51) Int. Cl.

| | |
|---|---|
| *H01M 4/36* | (2006.01) |
| *H01M 10/0525* | (2010.01) |
| *H01M 4/525* | (2010.01) |
| *H01M 4/505* | (2010.01) |
| *H01M 4/62* | (2006.01) |
| *H01M 4/131* | (2010.01) |
| *H01M 4/66* | (2006.01) |
| *H01M 4/136* | (2010.01) |
| *H01M 4/58* | (2010.01) |
| *H01M 4/02* | (2006.01) |

(52) U.S. Cl.
CPC .......... *H01M 4/366* (2013.01); *H01M 4/131* (2013.01); *H01M 4/136* (2013.01); *H01M 4/505* (2013.01); *H01M 4/525* (2013.01); *H01M 4/58* (2013.01); *H01M 4/62* (2013.01); *H01M 4/623* (2013.01); *H01M 4/625* (2013.01); *H01M 4/661* (2013.01); *H01M 10/0525* (2013.01); *H01M 2004/021* (2013.01)

(58) Field of Classification Search
CPC ........ H01M 4/366; H01M 4/136; H01M 4/58; H01M 4/505; H01M 4/525; H01M 4/131; H01M 10/0525

See application file for complete search history.

(56) References Cited

U.S. PATENT DOCUMENTS

| | | | |
|---|---|---|---|
| 5,962,167 A | 10/1999 | Nakai et al. | |
| 2007/0082265 A1* | 4/2007 | Itou ....................... | H01M 4/366 |
| | | | 429/231.1 |
| 2010/0028768 A1* | 2/2010 | Morita ................. | H01M 4/362 |
| | | | 429/231.1 |

FOREIGN PATENT DOCUMENTS

JP           10-154532 A       6/1998

* cited by examiner

*Primary Examiner* — Laura Weiner
(74) *Attorney, Agent, or Firm* — Sughrue Mion, PLLC

(57) ABSTRACT

Provided is a nonaqueous electrolytic solution secondary battery in which a positive electrode active material layer includes a phosphate compound, the nonaqueous electrolytic solution secondary battery having a low battery resistance. The nonaqueous electrolytic solution secondary battery disclosed herein includes an electrode body including a positive electrode provided with a positive electrode active material layer and a negative electrode, and a nonaqueous electrolytic solution. The positive electrode active material layer includes a positive electrode active material and a phosphate compound represented by $M_3PO_4$ where M is Li, Na, or H. The positive electrode active material is in the form of hollow particles, each having a shell configured of a layered lithium transition metal oxide, a hollow portion formed inside the shell, and a through hole passing through the shell. A DBP oil absorption amount of the positive electrode active material is 34 mL/100 g to 49 mL/100 g.

4 Claims, 2 Drawing Sheets

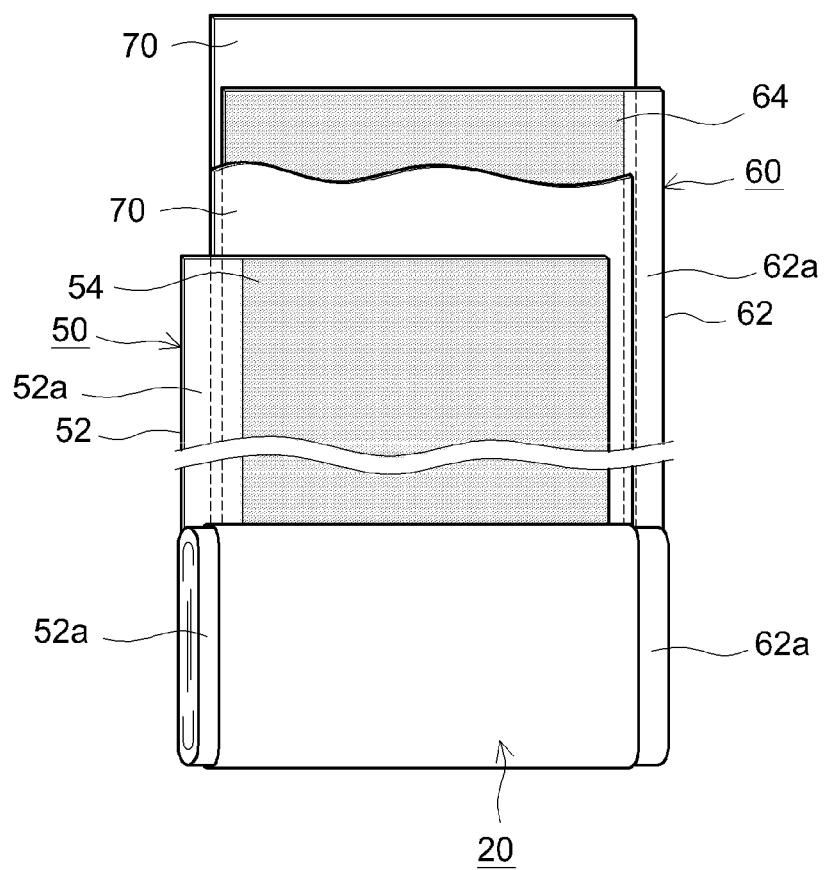

NONAQUEOUS ELECTROLYTIC SOLUTION SECONDARY BATTERY

BACKGROUND OF THE INVENTION

1. Field of the Invention

The present teaching relates to a nonaqueous electrolytic solution secondary battery. The present application claims priority to Japanese Patent Application No. 2015-217137 filed on Nov. 4, 2015, the entire contents of which are incorporated by reference in the present description.

2. Description of the Related Art

Nonaqueous electrolytic solution secondary batteries such as lithium ion secondary batteries (lithium secondary batteries) are lower in weight and higher in energy density than the conventional batteries. For this reason, in recent years, nonaqueous electrolytic solution secondary batteries have been used as the so-called portable power sources for personal computers, portable terminals, etc. and also as drive power sources for vehicles. In particular, lightweight lithium ion secondary batteries which make it possible to obtain a high energy density are expected to become increasingly popular in the future as high-output drive power sources for vehicles such as electric vehicles (EV), hybrid vehicles (HV), and plugin hybrid vehicles (PHV).

It is known that decomposition of a nonaqueous electrolytic solution in a nonaqueous electrolytic solution secondary battery degrades the battery performance. The decomposition of nonaqueous electrolytic solutions occurs particularly easily during the overcharge. Accordingly, various techniques for suppressing the decomposition of nonaqueous electrolytic solutions during the overcharge have been developed.

For example, Japanese Patent Application Laid-open No. H10-154532 suggests including a phosphate compound in a positive electrode active material layer of a positive electrode of a nonaqueous electrolytic solution secondary battery. In Japanese Patent Application Laid-open No. H10-154532, it is indicated that as a result of including a phosphate compound such as lithium phosphate in the positive electrode active material layer, it is possible to suppress electrochemical decomposition of the electrolytic solution even during the battery overcharge.

SUMMARY OF THE INVENTION

The comprehensive research conducted by the inventors has revealed that where solid particles which are generally used for the positive electrode active material is used and a phosphate compound are included in the positive electrode active material layer of the positive electrode of a nonaqueous electrolytic solution secondary battery, as suggested in Japanese Patent Application Laid-open No. H10-154532, a coating film derived from the phosphate compound is formed on the positive electrode active material surface, thereby increasing the battery resistance.

Accordingly, it is an objective of the present teaching to provide a nonaqueous electrolytic solution secondary battery in which a positive electrode active material layer includes a phosphate compound, the battery having a low battery resistance.

A first nonaqueous electrolytic solution secondary battery disclosed herein includes an electrode body including a positive electrode provided with a positive electrode active material layer and a negative electrode, and a nonaqueous electrolytic solution. The positive electrode active material layer includes a positive electrode active material and a phosphate compound represented by $M_3PO_4$ where M is Li, Na, or H. The positive electrode active material is in the form of hollow particles, each having a shell configured of a layered lithium transition metal oxide, a hollow portion formed inside the shell, and a through hole passing through the shell. A DBP oil absorption amount of the positive electrode active material is 34 mL/100 g to 49 mL/100 g.

As mentioned hereinabove, battery resistance is increased by the coating film derived from a phosphate compound and formed on the positive electrode active material surface. However, with the above-described configuration, portions where the coating film, which is derived from the phosphate compound and causes the increase in resistance, is not formed are present over a wide range inside the hollow particles which are the positive electrode active material and have a through hole in the shell. As a result, the increase in battery resistance caused by the addition of the phosphate compound can be suppressed. Thus, with the above-described configuration, it is possible to provide a nonaqueous electrolytic solution secondary battery in which a positive electrode active material layer includes a phosphate compound, the battery having a low battery resistance.

A second nonaqueous electrolytic solution secondary battery disclosed herein includes an electrode body including a positive electrode provided with a positive electrode active material layer and a negative electrode, and a nonaqueous electrolytic solution. The positive electrode active material layer includes a positive electrode active material and a phosphate compound represented by $M_3PO_4$ where M is Li, Na, or H. The positive electrode active material is in the form of hollow particles, each having a shell configured of a layered lithium transition metal oxide, a hollow portion formed inside the shell, and a through hole passing through the shell. A porosity of the positive electrode active material is 24% to 77%.

As mentioned hereinabove, battery resistance is increased by the coating film derived from a phosphate compound and formed on the positive electrode active material surface. However, with such a configuration, portions where the coating film, which is derived from the phosphate compound and causes the increase in resistance, is not formed are present over a wide range inside the hollow particles which are the positive electrode active material and have a through hole in the shell. As a result, the increase in battery resistance caused by the addition of the phosphate compound can be suppressed. Thus, with such a configuration, it is possible to provide a nonaqueous electrolytic solution secondary battery in which a positive electrode active material layer includes a phosphate compound, the battery having a low battery resistance.

In the desired embodiment of the first and second nonaqueous electrolytic solution secondary batteries disclosed herein, the phosphate compound is $Li_3PO_4$.

With such a configuration, it is possible to provide a nonaqueous electrolytic solution secondary battery with even lower battery resistance.

BRIEF DESCRIPTION OF THE DRAWINGS

FIG. 2 is a schematic diagram illustrating the configuration of the wound electrode body of the lithium ion secondary battery which is an embodiment of the present teaching.

DESCRIPTION OF THE PREFERRED EMBODIMENTS

Figure 1:
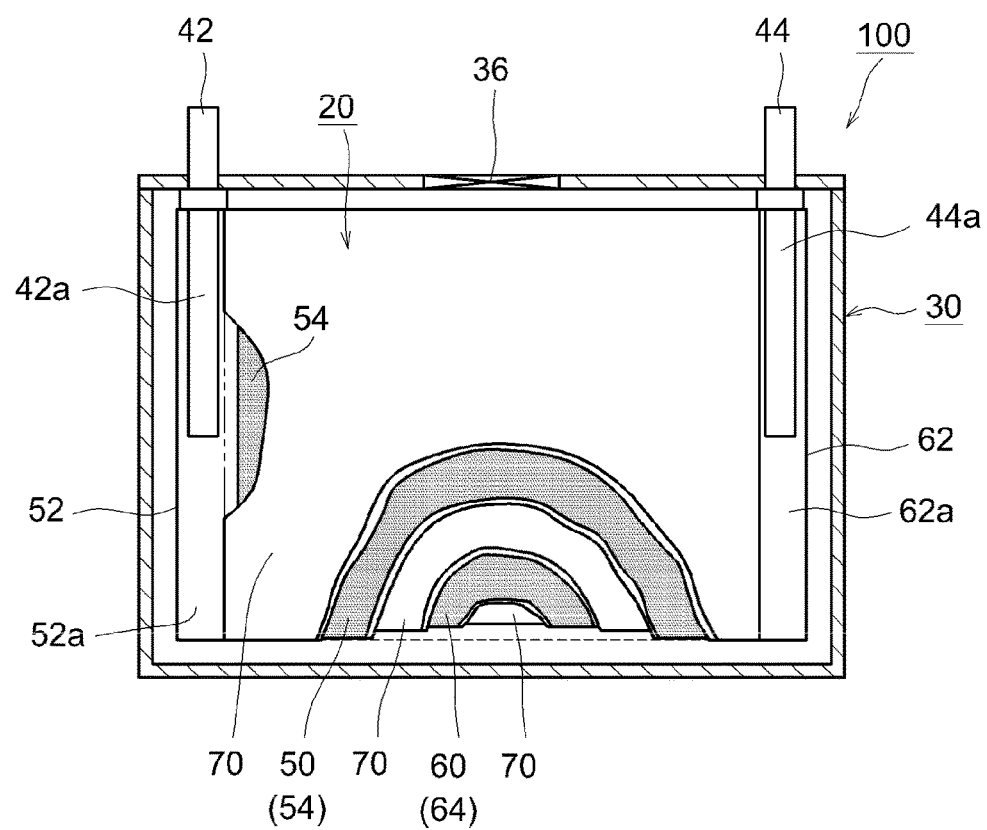
FIG. 1 is a cross-sectional view schematically illustrating the internal structure of a lithium ion secondary battery which is an embodiment of the present teaching.

An embodiment of the present teaching will be explained hereinbelow with reference to the drawings. Features other than those specifically described in the present specification, but necessary for implementing the present teaching (for example, the typical configuration and manufacturing process of a nonaqueous electrolytic solution secondary battery, which do not characterize the present teaching) can be considered as design matters for a person skilled in the art that are based on the conventional techniques in the pertinent field. The present teaching can be implemented on the basis of the contents disclosed in the present specification and common technical knowledge in the pertinent field. In the below-described drawings, members and parts performing the same action are assigned with same reference numerals. Further, dimensional relationships (length, width, thickness, and the like) in the drawings do not necessarily reflect the actual dimensional relationships.

The "secondary battery", as referred to in the present specification, is a general term representing power storage devices that can be repeatedly charged and discharged. This term is inclusive of the so-called storage batteries such as lithium ion secondary batteries and also power storage elements such as electric double-layer capacitors.

The embodiments (first embodiment and second embodiment) of the present teaching will be explained hereinbelow in detail with reference to a flat angular lithium ion secondary battery as examples, but the present teaching is not intended to be limited to the battery described in the embodiments.

[First Embodiment]

Described initially will be the first embodiment of the nonaqueous electrolytic solution secondary battery disclosed herein. A lithium ion secondary battery 100 depicted in FIG. 1 is a sealed lithium ion secondary battery 100 configured by housing a flat wound electrode body 20 and a nonaqueous electrolytic solution (not depicted in the figure) in a flat angular battery case (that is, an outer case) 30. The battery case 30 is provided with a positive electrode terminal 42 and a negative electrode terminal 44 for external connection and a thin safety valve 36 that is set such as to release the internal pressure of the battery case 30 when the internal pressure rises to or above a predetermined level. The battery case 30 is also provided with a pouring hole (not depicted in the figure) for pouring the nonaqueous electrolytic solution. The positive electrode terminal 42 is electrically connected to a positive electrode collector plate 42a. The negative electrode terminal 44 is electrically connected to a negative electrode collector plate 44a. For example, a lightweight metal material with good thermal conductivity, such as aluminum, can be used as a material for the battery case 30.

As depicted in FIGS. 1 and 2, the wound electrode body 20 has a shape in which a positive electrode sheet 50 in which a positive electrode active material layer 54 is formed along the longitudinal direction on one or both surfaces (in this case, on both surfaces) of an elongated positive electrode collector 52 and a negative electrode sheet 60 in which a negative electrode active material layer 64 is formed along the longitudinal direction on one or both surfaces (in this case, on both surfaces) of an elongated negative electrode collector 62 are laminated, with two elongated separator sheets 70 being interposed therebetween, and wound in the longitudinal direction. The positive electrode collector plate 42a and the negative electrode collector plate 44a are respectively joined to a positive electrode active material layer non-formation portion 52a (that is, a portion where the positive electrode active material layer 54 is not formed and the positive electrode collector 52 is exposed) and a negative electrode active material layer non-formation portion 62a (that is, a portion where the negative electrode active material layer 64 is not formed and the negative electrode collector 62 is exposed) which are formed to protrude outward from two ends of the wound electrode body 20 in the winding axis direction (that is, in the width direction of the sheet which is perpendicular to the longitudinal direction).

For example, an aluminum foil can be used as the positive electrode collector 52 constituting the positive electrode sheet 50. The positive electrode active material layer 54 includes a positive electrode active material and a phosphate compound. The positive electrode active material layer 54 can also include components other than the positive electrode active material and phosphate compound, for example, an electrically conductive material and a binder. For example, carbon black such as acetylene black (AB) and other carbon materials (for example, graphite) can be advantageously used as the electrically conductive material. For example, polyvinylidene fluoride (PVDF) can be used as the binder.

In the present embodiment, a compound represented by $M_3PO_4$ where M is Li, Na, or H is used as the phosphate compound. The phosphate compound is a component that suppresses the electrochemical decomposition of the nonaqueous electrolytic solution when the battery is overcharged. The three M in the phosphate compound may be the same or different, desirably the same. It is desired that the phosphate compound be $Li_3PO_4$ because this compound is particularly effective in reducing the battery resistance. The phosphate compound is contained desirably at 0.01% by weight to 20% by weight, more desirably 0.1% by weight to 10% by weight, and even more desirably 1% by weight to 5% by weight with respect to the positive electrode active material.

In the present embodiment, a material in the form of hollow particles, each particle having a shell configured of a layered lithium transition metal oxide, a hollow portion formed inside the shell, and a through hole passing through the shell, is used as the positive electrode active material. The positive electrode active material (hollow particles) has a specific degree of hollowness.

The phosphate compound is partially decomposed by an electric potential or an acid, and a coating film derived from the phosphate compound is formed on the positive electrode active material surface. The coating film increases the battery resistance. When solid particles, which are generally used as the positive electrode active material, and a phosphate compound are used together, the coating film derived from the phosphate compound is formed on the outer surface of the positive electrode active material. As a result, the electric resistance of the entire surface of the positive electrode active material increases.

However, by using the hollow particles having a specific degree of hollowness and a through hole in the shell as the positive electrode active material, as indicated in the below-described example, it is possible to suppress the increase in battery resistance. Although a coating film derived from a phosphate compound is easily formed on the outer surface of the positive electrode active material, since the phosphate compound is unlikely to penetrate into the hollow portions of the positive electrode active material, the coating film derived from the phosphate compound is unlikely to be formed on the inner surface of the positive electrode active material. Therefore, when the positive electrode active material is in the form of hollow particles, portions where the coating film, which is derived from the phosphate compound and causes the increase in resistance, is not formed are present over a wide range inside the hollow particles. This is apparently why the increase in battery resistance caused by the addition of the phosphate compound can be suppressed. Moreover, the hollow particles are bulkier than solid particles. For this reason, where the positive electrode active material layer is pressed to adjust, for instance, the attached amount and density thereof when the positive electrode is fabricated, the adhesion to the electrically conductive material is increased and current collection ability is improved. This apparently also enhances the effect of decreasing the battery resistance.

Further, as a result of using hollow particles having a specific degree of hollowness and a through hole in the shell as a positive electrode active material, as in the below-described example, it is possible to increase the capacity retention ratio (charge-discharge cycle characteristic) of the battery. In the case of using solid particles which are generally used as the positive electrode active material, current collection proceeds only on the outer surface of the positive electrode active material. Therefore, there is a single current collection axis in the radial direction. This is apparently why polarization occurs inside the particles and the reaction becomes uneven, thereby facilitating the degradation of the positive electrode active material. In particular, since the solid particles have a high-resistance coating film on the outer surface, the polarization is accelerated.

However, where hollow particles having a specific degree of hollowness and a through hole in the shell are used as the positive electrode active material, since current collection can proceed also inside the particles, there is a plurality of current collection axes in the radial directions. Further, since no coating film is formed on the inner surface and the resistance thereof is low, the polarization is unlikely to occur. This is apparently why the capacity retention ratio of the battery increases. Further, the hollow particles are bulkier than solid particles. For this reason, where the positive electrode active material layer is pressed to adjust, for instance, the attached amount and density thereof when the positive electrode is fabricated, the adhesion to the electrically conductive material is increased, and a conductive path is unlikely to be cut off. This is apparently also why the effect of increasing the capacity retention ratio of the battery is enhanced.

A DBP (dibutyl phthalate) oil absorption amount is an indicator representing the degree of hollowness of hollow particles. Accordingly, in the present embodiment, the DBP oil absorption amount of the positive electrode active material is 34 mL/100 g to 49 mL/100 g. Where the DBP oil absorption amount of the positive electrode active material is less than 34 mL/100 g, the battery resistance increases. This is because the ratio of the low-resistance inner surface of the positive electrode active material becomes too small. Another reason is that since the positive electrode active material does not become sufficiently bulky, the effect of increasing the current collection ability cannot be obtained. In addition, where the DBP oil absorption amount of the positive electrode active material is less than 34 mL/100 g, the capacity retention ratio of the battery also decreases. This is because there is substantially a single current collection axis in the radial direction and the effect of suppressing the polarization of the positive electrode active material particles cannot be obtained. Another reason is apparently that the effect of increasing the adhesion of the positive electrode active material and the electrically conductive material becomes insufficient. Where the DBP oil absorption amount of the positive electrode active material is greater than 49 mL/100 g, the battery resistance increases. This is apparently because the strength of the hollow particles decreases, cracking occurs, and current collection ability is degraded. In addition, where the DBP oil absorption amount of the positive electrode active material is greater than 49 mL/100 g, the capacity retention ratio of the battery decreases. This is apparently because the strength of the hollow particles decreases, cracking occurs, and current collection ability is degraded.

It is desired that the DBP oil absorption amount of the positive electrode active material be 35 mL/100 g to 49 mL/100 g, more desirably 38 mL/100 g to 49 mL/100 g, and even more desirably 38 mL/100 g to 43 mL/100 g, because a lower battery resistance is obtained. The DBP oil absorption amount can be determined according to the method described in JIS K6217-4 (2008) by using dibutyl phthalate.

The shell of the positive electrode active material is configured of a layered lithium transition metal oxide, typically of primary particles of a layered lithium transition metal oxide. The lithium transition metal oxide is typically an oxide (lithium transition metal oxide) having a layered structure and including lithium and one or two or more transition metal elements as constituent metal elements, such as lithium nickel oxide (for example, $LiNiO_2$), lithium cobalt oxide (for example, $LiCoO_2$), and lithium manganese oxide (for example, $LiMn_2O_4$). Among them, lithium transition metal oxides of a layered rock-salt structure that include nickel as a constituent element are desired, and lithium-nickel-cobalt-manganese composite oxides (for example, $LiNi_{1/3}Co_{1/3}Mn_{1/3}O_2$) including nickel, cobalt, and manganese are more desired.

Here, lithium-nickel-cobalt-manganese composite oxides mean to include not only oxides including Li, Ni, Co, and Mn as constituent metal elements, but also oxides including at least one other element in addition to Li, Ni, Co, and Mn. Examples of such additional elements include any element that belongs to Group 1 (alkali metals such as sodium), Group 2 (alkaline earth metals such as magnesium and calcium), Group 4 (transition metals such as titanium and zirconium), Group 6 (transition metals such as chromium and tungsten), Group 8 (transition metals such as iron), Group 13 (boron, which is a metalloid element, or a metal such as aluminum), and Group 17 (halogens such as fluorine) in the periodic table. Typical examples include W, Zr, Mg, Ca, Na, Fe, Cr, Zn, Si, Sn, Al, B, and F. The same is true with respect to lithium nickel oxides, lithium cobalt oxides, and lithium manganese oxides.

A method for manufacturing the positive electrode active material (hollow particles) having a specific DBP oil absorption amount is not particularly limited. For example, where a positive electrode active material is fabricated by fabricating a transition-metal-containing hydroxide by a crystallization method and calcining the transition-metal-containing hydroxide together with a lithium compound, the DBP oil absorption amount of the positive electrode active material can be controlled by changing the crystallization conditions of the transition-metal-containing hydroxide.

For example, a copper foil can be used as the negative electrode collector 62 constituting the negative electrode sheet 60. For example, a carbon material such as graphite, hard carbon, and soft carbon can be used as the negative electrode active material to be included in the negative electrode active material layer 64. The negative electrode active material layer 64 can include components other than the active material, for example, a binder and a thickening agent. For example, a styrene-butadiene rubber (SBR) can be used as the binder. For example, carboxymethyl cellulose (CMC) can be used as the thickening agent.

For example, a porous sheet (film) configured of a resin such as polyethylene (PE), polypropylene (PP), polyesters, cellulose, and polyamides can be used as the separator 70. The porous sheet may have a monolayer structure or a laminated structure of two or more layers (for example, a three-layer structure in which a PP layer is laminated on both surfaces of a PE layer). A heat-resistant layer (HRL) may be provided on the surface of the separator 70.

A nonaqueous electrolytic solution same as or similar to that of the conventional lithium ion secondary batteries can be used. Typically, a nonaqueous electrolytic solution in which a support salt is contained in an organic solvent (nonaqueous solvent) can be used. Organic solvents such as various carbonates, ethers, esters, nitriles, sulfones, and lactones which are used in electrolytic solutions of typical lithium ion secondary batteries can be used, without any particular limitation, as the nonaqueous solvent. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyldifluoromethyl carbonate (F-DMC), and trifluorodimethyl carbonate (TFDMC). Such nonaqueous solvents can be used individually or in appropriate combinations of two or more thereof. For example, lithium salts such as $LiPF_6$, $LiBF_4$, and $LiClO_4$ (desirably, $LiPF_6$) can be advantageously used as the support salt. The concentration of the support salt is desirably 0.7 mol/L or more to 1.3 mol/L or less.

The nonaqueous electrolytic solution can include various additives such as a gas generating agent such as biphenyl (BP) and cyclohexylbenzene (CHB); a film-forming agent such as an oxalate complex compound including a boron atom and/or a phosphorus atom, and vinylene carbonate (VC); a dispersant; and a thickening agent, provided that the advantageous effects of the present teaching are not significantly degraded.

The lithium ion secondary battery 100 configured in the above-described manner is suitable for a variety of applications. The advantageous applications include drive power sources installed on vehicles such as electric vehicles (EV), hybrid vehicles (HV), and plugin hybrid vehicles (PHV). The lithium ion secondary batteries 100 can be typically used in the form of battery packs in which a plurality of batteries is connected in series and/or in parallel.

[Second Embodiment]

Described hereinbelow is the second embodiment of the nonaqueous electrolytic solution secondary battery disclosed herein. In the present embodiment, for the same reasons as described hereinabove, a material in the form of hollow particles, each particle having a shell configured of a layered lithium transition metal oxide, a hollow portion formed inside the shell, and a through hole passing through the shell, is used as the positive electrode active material. The positive electrode active material (hollow particles) has a specific degree of hollowness.

A porosity is an indicator representing the degree of hollowness of hollow particles. Accordingly, in the present embodiment, the porosity of the positive electrode active material is 24% to 77%. Where the porosity of the positive electrode active material is less than 24%, the battery resistance increases. This is apparently because the ratio of the low-resistance inner surface of the positive electrode active material becomes too small. Another reason is apparently that since the positive electrode active material does not become sufficiently bulky, the effect of increasing the current collection ability cannot be obtained. In addition, where the porosity of the positive electrode active material is less than 24%, the capacity retention ratio of the battery also decreases. This is because there is substantially a single current collection axis in the radial direction and the effect of suppressing the polarization of the positive electrode active material particles cannot be obtained. Another reason is apparently that the effect of increasing the adhesion of the positive electrode active material and the electrically conductive material becomes insufficient. Where the porosity of the positive electrode active material is greater than 77%, the battery resistance increases. This is apparently because the strength of the hollow particles decreases, cracking occurs, and current collection ability is degraded. In addition, where the porosity of the positive electrode active material is greater than 77%, the capacity retention ratio of the battery decreases. This is apparently because the strength of the hollow particles decreases, cracking occurs, and current collection ability is degraded.

The porosity can be determined, for example, in the following manner. A scanning electron microscopic (SEM) image of the cross section of the positive electrode active material layer is acquired. In the SEM image, particles with a size of 1 μm or more that have voids (holes) are selected as hollow particles and taken as measurement objects. The SEM image is processed for each single particle with an image analysis software by using the contrast of the reflected electron image. More specifically, the porosity of a single particle is determined by dividing the area of the void portion present on the inside of the outer periphery of the particle cross section by the area of the circumscribed circle of the particle cross section. The average value of porosity is determined for 10 or more particles, and this value is taken as the porosity of the positive electrode active material.

A method for manufacturing the positive electrode active material (hollow particles) having a specific porosity is not particularly limited. For example, where a positive electrode active material is fabricated by fabricating a transition-metal-containing hydroxide by a crystallization method and calcining the transition-metal-containing hydroxide together with a lithium compound, the porosity of the positive electrode active material can be controlled by changing the crystallization conditions of the transition-metal-containing hydroxide.

A lithium ion secondary battery can be configured in the same manner as in the above-described first embodiment (lithium ion secondary battery 100), except that the hollow particles having the specific porosity are used as the positive electrode active material.

The embodiments are explained hereinabove with reference to an angular lithium ion secondary battery provided with a flat wound electrode body. However, the lithium ion secondary battery can be also configured to have a laminated electrode body. Further, the lithium ion secondary battery can be also configured as a cylindrical lithium ion secondary battery. Furthermore, the technique disclosed herein is also applicable to nonaqueous electrolytic solution secondary batteries other than the lithium ion secondary battery.

Examples relating to the present teaching will be described hereinbelow, but the present teaching is not intended to be limited to these examples.

<Fabrication of Hollow Positive Electrode Active Material>

A mixed aqueous solution was prepared by dissolving nickel sulfate, cobalt sulfate, and manganese sulfate in water such that the molar ratio of Ni:Co:Mn was 0.33:0.33:0.33 and the total molar concentration of Ni, Co, and Mn was 1.8 mol/L. The mixed aqueous solution, a NaOH aqueous solution, and ammonia water were supplied into a reaction tank at a constant rate, while controlling pH to 13, and a nickel-cobalt-manganese composite hydroxide was crystallized in the reaction liquid. The supply rate of the NaOH aqueous solution was then reduced, the supply of the mixed aqueous solution, NaOH aqueous solution, and ammonia water was then continued for 6 h, while controlling the pH in the reaction tank to 11, and nickel-cobalt-manganese composite hydroxide particles were grown. The nickel-cobalt-manganese composite hydroxide particles were then taken out from the reaction tank, washed with water, and dried. The obtained nickel-cobalt-manganese composite hydroxide particles were then heat treated for 10 h at 100° C. in the air atmosphere. Then, $Li_2CO_3$ as a lithium source and nickel-cobalt-manganese composite hydroxide particles were mixed such that the ratio (MLi/MMe) of the molar number (MLi) of lithium and the total molar number (MMe) of Ni, Co, and Mn was 1.15. The mixture was calcined for 10 h at 850° C. to obtain hollow particles (positive electrode active material) having a through hole in a shell and a composition represented by $Li_{1.15}Ni_{0.33}Co_{0.33}Mn_{0.33}O_2$.

Various hollow particles (positive electrode active materials) with a through hole in a shell that differed in the DBP oil absorption amount and porosity were obtained by adjusting the pH and the concentration of ammonia water in the reaction liquid in the reaction tank, more specifically, by changing pH at the nucleation stage between 11 and 14.

<Fabrication of Solid Positive Electrode Active Material>

Solid particles (positive electrode active material) of the composition represented by $Li_{1.15}Ni_{0.33}Co_{0.33}Mn_{0.33}O_2$ were obtained in the same manner as described hereinabove, except that the mixed aqueous solution, NaOH aqueous solution, and ammonia water were supplied into the reaction tank such that the pH of the reaction liquid inside the reaction tank was 11 at all times. Several types of solid particles (positive electrode active materials) that differed in the DBP oil absorption amount were fabricated.

<Measurement of DBP Oil Absorption Amount of Positive Electrode Active Material>

The DBP oil absorption amount of the positive electrode active material was determined according to the method described in JIS K6217-4 (2008) by using dibutyl phthalate.

<Measurement of Porosity of Positive Electrode Active Material>

A SEM image (×3000) of the cross section of the positive electrode sheet was captured. Particles with a size of 1 μm or more that had voids were selected as hollow particles and taken as measurement objects. The SEM image was processed for each single particle with an image analysis software by using the contrast of the reflected electron image. More specifically, the porosity of a single particle was determined by dividing the area of the void portion present on the inside of the outer periphery of the particle cross section by the area of the circumscribed circle of the particle cross section. The average value of porosity was determined for 10 or more particles, and this value was taken as the porosity of the positive electrode active material.

<Fabrication of Batteries for Evaluation>

(Batteries No. 1 to No. 9)

Acetylene black (AB) as an electrically conductive material, PVDF as a binder, polyvinyl pyrrolidone as a dispersant, $Li_3PO_4$ which is a phosphate compound, and N-methyl pyrrolidone (NMP) which is a solvent were mixed. The hollow positive electrode active material having the oil absorption amount (and porosity) shown in Table 1 and NMP as a solvent were added to the obtained mixture to obtain the solid content concentration of 56% by weight. A positive electrode paste was obtained by mixing the components with a planetary mixer. The weight ratio of the positive electrode active material, electrically conductive material, binder, and dispersant, as solid components in the positive electrode paste, was positive electrode active material:electrically conductive material:binder:dispersant=80:8:2:0.2. The phosphate compound was blended at 3% by weight with respect to the positive electrode active material.

A positive electrode was fabricated by band-like coating the obtained positive electrode paste on both surfaces of an elongated aluminum foil by using a die coater, drying, and then pressing.

Further, graphite (C) as a negative electrode active material, SBR as a binder, and CMC as a thickening agent were mixed at a weight ratio of C:SBR:CMC=98:1:1 with ion-exchanged water to prepare a negative electrode paste. A negative electrode was fabricated by band-like coating the obtained negative electrode paste on both surfaces of an elongated copper foil by using a die coater, drying, and then pressing.

A flat wound electrode body was fabricated by laminating and winding the fabricated positive electrode and negative electrode with both separator sheets (here, porous sheets in which polypropylene (PP) was laminated on both surfaces of polyethylene (PE)), and then pressing and squashing from the side surface direction. A positive electrode terminal and a negative electrode terminal were then connected to the wound electrode body, and the electrode body was housed in an angular battery case having an electrolytic solution pouring port.

A nonaqueous electrolytic solution was poured from the electrolytic solution pouring port, and the wound electrode body was impregnated with the nonaqueous electrolytic solution. The nonaqueous electrolytic solution was prepared by dissolving $LiPF_6$ as a support salt at a concentration of 1.0 mol/L in a mixed solvent including ethylene carbonate (EC), dimethyl carbonate (DMC), and ethyl methyl carbonate (EMC) at a volume ratio of EC:DMC:EMC=30:40:30. Lithium ion secondary batteries No. 1 to No. 9 were then obtained by sealing the electrolytic solution pouring port.

(Batteries No. 10 to No. 13)

Lithium ion secondary batteries No. 10 to No. 13 were obtained by the same fabrication method as the batteries No. 1 to No. 9, except that hollow positive electrode active materials having the oil absorption amount shown in Table 1 were used and no phosphate compound was added.

(Batteries No. 14 to No. 17)

Lithium ion secondary batteries No. 14 to No. 17 were obtained by the same fabrication method as the batteries No. 1 to No. 9, except that solid positive electrode active materials having the oil absorption amount shown in Table 1 were used.

<Measurement of Initial Capacity>

Each lithium ion secondary battery was placed under an environment at 25° C. The battery was fully charged by constant-current charging to 4.2 V at a current value of ⅓ C and then by constant-voltage charging till the current value reached 1/50 C. The capacity obtained when the battery was thereafter constant-current discharged to 3 V at a current value of 1/3 C was taken as the initial capacity.

<Measurement of Temperature Rise During Overcharge>

Each lithium ion secondary battery was charged to 4.1 V and allowed to cool to room temperature. A thermometer was set in the central portion of the side surface of the battery case. The battery was charged to an overcharge state (4.8 V), and a temperature in 10 min after a voltage of 4.8 V was reached was measured. A difference between this temperature and the temperature before the overcharge was determined, and the value obtained was taken as the temperature rise (° C.) during the overcharge.

<Measurement of Battery Resistance>

Each lithium ion secondary battery was CC charged at a rate of 1/3 C till a SOC of 60% was reached under a temperature environment of 25° C. The batteries adjusted to a state of SOC of 60% were CC discharged at rates of 1 C, 3 C, 5 C, and 10 C, and a drop in voltage over 10 s from the start of each discharge was measured. An IV resistance (Ω) was calculated by dividing the measured value (V) of voltage drop by the corresponding current value, and the average value of the calculated results was taken as the battery resistance. The voltage resistance ratio of the batteries was calculated by taking the battery resistance of the battery No. 4 as 100.

<High-Temperature Cycle Evaluation>

Each lithium ion secondary battery was placed under an environment at 65° C. The batteries were then repeatedly subjected to 200 charging-discharging cycles, one cycle involving constant-current charging at 2 C to 4.3 V and constant-current discharging at 2 C to 3 V. The battery capacity after 200 charging-discharging cycles was measured by the same method as was used in initial capacity measurement. A value obtained by dividing the battery capacity after 200 charging-discharging cycles by the initial capacity was determined as a capacity retention ratio (%).

The evaluation results are shown in Table 1.

electrolytic solution decomposition reaction which is an exothermic reaction occurred.

The evaluation results relating to batteries No. 14 to No. 17 indicate that when the positive electrode active material is in the form of solid particles, although the effect of suppressing the temperature rise during the overcharge which is demonstrated by the phosphate compound is obtained, the battery resistance increases.

By contrast, the evaluation results relating to batteries No. 1 to No. 9 indicate that where the positive electrode active material is in the form of hollow particles having a through hole in the shell, and the oil absorption amount thereof is within a range of 34 mL/100 g to 49 mL/100 g, the effect of suppressing the temperature rise during the overcharge which is demonstrated by the phosphate compound is obtained, and the battery resistance is specifically decreased. Further, it is also clear that the capacity retention ratio is specifically increased.

Further, the evaluation results relating to batteries No. 1 to No. 9 indicate that where the positive electrode active material is in the form of hollow particles having a through hole in the shell, and the porosity thereof is 24% to 77%, the effect of suppressing the temperature rise during the overcharge which is demonstrated by the phosphate compound is obtained, and the battery resistance is specifically decreased. Further, it is also clear that the capacity retention ratio is specifically increased.

<Fabrication of Evaluation Batteries>

(Batteries No. 18 to No. 20)

Lithium ion secondary batteries No. 18 to No. 20 were obtained by the same fabrication method as the batteries No. 1 to No. 9, except that hollow positive electrode active materials having a through hole in the shell and an oil absorption amount shown in Table 2 were used and $H_3PO_4$ was used as the phosphate compound.

(Batteries No. 21 to No. 23)

Lithium ion secondary batteries No. 21 to No. 23 were obtained by the same fabrication method as the batteries No.

TABLE 1

| Battery | $Li_3PO_4$ | Shape of positive electrode active material particles | Positive electrode active material oil absorption amount (mL/100 g) | Porosity (%) | Temperature rise during overcharge (° C.) | Battery resistance ratio | Capacity retention ratio (%) |
|---|---|---|---|---|---|---|---|
| No. 1 | Added | Hollow | 27 | 12 | 12 | 138 | 93 |
| No. 2 | Added | Hollow | 30 | 17 | 10 | 136 | 94 |
| No. 3 | Added | Hollow | 32 | 20 | 13 | 133 | 93 |
| No. 4 | Added | Hollow | 34 | 24 | 11 | 100 | 98 |
| No. 5 | Added | Hollow | 35 | 33 | 10 | 91 | 97 |
| No. 6 | Added | Hollow | 38 | 39 | 13 | 82 | 99 |
| No. 7 | Added | Hollow | 43 | 52 | 12 | 78 | 98 |
| No. 8 | Added | Hollow | 49 | 77 | 13 | 86 | 96 |
| No. 9 | Added | Hollow | 52 | 82 | 15 | 127 | 91 |
| No. 10 | Not added | Hollow | 27 | — | 40 | 95 | 93 |
| No. 11 | Not added | Hollow | 34 | — | 35 | 91 | 94 |
| No. 12 | Not added | Hollow | 37 | — | 37 | 88 | 95 |
| No. 13 | Not added | Hollow | 42 | — | 35 | 86 | 95 |
| No. 14 | Added | Solid | 27 | — | 11 | 145 | 92 |
| No. 15 | Added | Solid | 32 | — | 12 | 140 | 94 |
| No. 16 | Added | Solid | 35 | — | 10 | 136 | 92 |
| No. 17 | Added | Solid | 37 | — | 13 | 134 | 93 |

The evaluation results relating to batteries No. 10 to No. 13 indicate that when the positive electrode active material does not include a phosphate compound, the temperature rise during the overcharge is large. This is apparently because the effect of suppressing the decomposition of the nonaqueous electrolytic solution which is demonstrated by the phosphate compound was not obtained and a frequent 1 to No. 9, except that hollow positive electrode active materials having a through hole in the shell and an oil absorption amount shown in Table 2 were used and $Na_3PO_4$ was used as the phosphate compound.

The above-described property evaluations were performed with respect to the batteries No. 18 to No. 23. The evaluation results are shown together with the evaluation results relating to batteries No. 3, 5, and 9 in Table 2.

TABLE 2

| Battery | Phosphate compound | Positive electrode active material oil absorption amount (mL/100 g) | Temperature rise during overcharge (° C.) | Battery resistance ratio | Capacity retention ratio (%) |
| --- | --- | --- | --- | --- | --- |
| No. 3 | $Li_3PO_4$ | 32 | 13 | 133 | 93 |
| No. 5 | $Li_3PO_4$ | 35 | 10 | 91 | 97 |
| No. 9 | $Li_3PO_4$ | 52 | 15 | 127 | 91 |
| No. 18 | $H_3PO_4$ | 30 | 14 | 140 | 92 |
| No. 19 | $H_3PO_4$ | 35 | 12 | 93 | 96 |
| No. 20 | $H_3PO_4$ | 54 | 13 | 125 | 93 |
| No. 21 | $Na_3PO_4$ | 29 | 13 | 137 | 92 |
| No. 22 | $Na_3PO_4$ | 35 | 15 | 95 | 96 |
| No. 23 | $Na_3PO_4$ | 53 | 14 | 130 | 91 |

The evaluation results relating to batteries No. 3, 5, and 9 and batteries No. 18 to No. 23 indicate that the trends observed when the phosphate compound is $H_3PO_4$ and $Na_3PO_4$ are the same as those observed when the phosphate compound is $Li_3PO_4$. Therefore, it is clear that not only $Li_3PO_4$, but also $H_3PO_4$ and $Na_3PO_4$ can be used as the phosphate compound.

Specific examples of the present teaching are described hereinabove in detail, but these examples are not limiting and place no restriction on the claims. The technique set forth in the claims is inclusive of various modifications and changes of the specific examples presented hereinabove.

What is claimed is:

1. A nonaqueous electrolytic solution secondary battery comprising:
    an electrode body including a positive electrode provided with a positive electrode active material layer and a negative electrode; and
    a nonaqueous electrolytic solution, wherein
    the positive electrode active material layer includes a positive electrode active material and a phosphate compound represented by $M_3PO_4$ where M is Li, Na, or H;
    the positive electrode active material is in the form of hollow particles, each of the hollow particles having a shell configured of a layered lithium transition metal oxide, a hollow portion formed inside the shell, and a through hole passing through the shell; and
    a DBP oil absorption amount of the positive electrode active material is 34 mL/100 g to 49 mL/100 g.

2. The nonaqueous electrolytic solution secondary battery according to claim 1, wherein the phosphate compound is $Li_3PO_4$.

3. A nonaqueous electrolytic solution secondary battery comprising:
    an electrode body including a positive electrode provided with a positive electrode active material layer and a negative electrode; and
    a nonaqueous electrolytic solution, wherein
    the positive electrode active material layer includes a positive electrode active material and a phosphate compound represented by $M_3PO_4$ where M is Li, Na, or H;
    the positive electrode active material is in the form of hollow particles, each of the hollow particles having a shell configured of a layered lithium transition metal oxide, a hollow portion formed inside the shell, and a through hole passing through the shell; and
    a porosity of the positive electrode active material is 24% to 77%.

4. The nonaqueous electrolytic solution secondary battery according to claim 3, wherein the phosphate compound is $Li_3PO_4$.

* * * * *